US009500486B2

(12) United States Patent
Gale et al.

(10) Patent No.: US 9,500,486 B2
(45) Date of Patent: Nov. 22, 2016

(54) METHOD AND APPARATUS FOR FORMULATING A POSITIONING EXTENT FOR MAP MATCHING

(71) Applicant: HERE GLOBAL B.V., Veldhoven (SE)

(72) Inventors: William Gale, Oak Park, IL (US); Nicholas Sula, Veldhoven (NL)

(73) Assignee: HERE GLOBAL B.V., Veldhoven (NL)

( * ) Notice: Subject to any disclaimer, the term of this patent is extended or adjusted under 35 U.S.C. 154(b) by 56 days.

(21) Appl. No.: 13/780,722

(22) Filed: Feb. 28, 2013

(65) Prior Publication Data

US 2014/0244164 A1   Aug. 28, 2014

(51) Int. Cl.
*G01C 21/30* (2006.01)
(52) U.S. Cl.
CPC .................................. *G01C 21/30* (2013.01)
(58) Field of Classification Search
CPC .... G01C 21/165; G01C 23/00; G01C 21/28; G01C 21/26; G01C 21/30; G01S 19/49
USPC .......................... 701/400, 410, 446, 532, 533
See application file for complete search history.

(56) References Cited

U.S. PATENT DOCUMENTS

| 6,035,253 A | 3/2000 | Hayashi et al. | |
| 2008/0242315 A1* | 10/2008 | Ferman | G08G 1/0104 455/456.2 |
| 2011/0118972 A1* | 5/2011 | Boschker | G01C 21/3476 701/532 |
| 2011/0231086 A1* | 9/2011 | Montealegre | G01C 21/3461 701/532 |
| 2012/0095682 A1* | 4/2012 | Wilson | G01C 21/32 701/532 |
| 2012/0209507 A1* | 8/2012 | Serbanescu | G01C 21/30 701/410 |
| 2012/0259547 A1* | 10/2012 | Morlock | G01C 21/32 701/533 |
| 2013/0261954 A1* | 10/2013 | Boschker | G01C 21/00 701/410 |

OTHER PUBLICATIONS

Daoqin Tong et al., "Traffic Information for Deriving Using GPS Probe Vehicle Data Integrated with GIS" Research paper, Department of Civil and Environmental Engineering and Geodetic science The Ohio State University, Nov. 17, 2005, The Ohio State University, pp. 1-23, Nov. 17, 2005.
Stephan Schroedl et al. "Mining GPS Traces for Map Refinement" Researh Paper, Data mining and Knowledge Discovery, May 16, 2001; Revised Aug. 23, 2002.

* cited by examiner

*Primary Examiner* — Shardul Patel
(74) *Attorney, Agent, or Firm* — Ditthavong & Steiner, P.C.

(57) ABSTRACT

An approach is provided for formulating a positioning extent for map matching. The positioning extent platform processes and/or facilitates a processing of a plurality of position data points acquired by at least one positioning system to determine one or more variations in the plurality of position data points with respect to one or more thoroughfare segments. Next, the positioning extent platform determines one or more positioning extents associated with the one or more thoroughfare segments for the at least one positioning system based, at least in part, on the one or more variations.

18 Claims, 17 Drawing Sheets

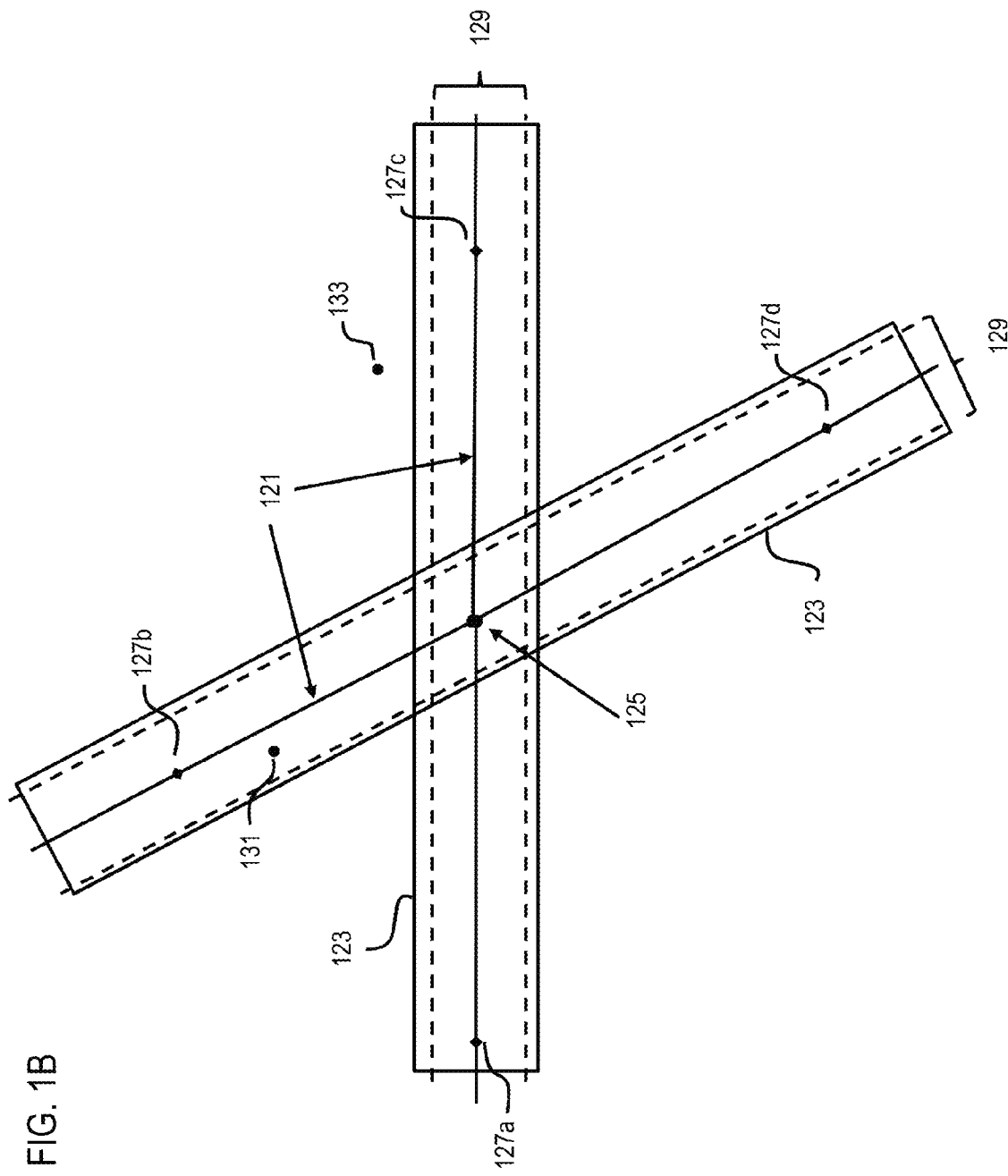

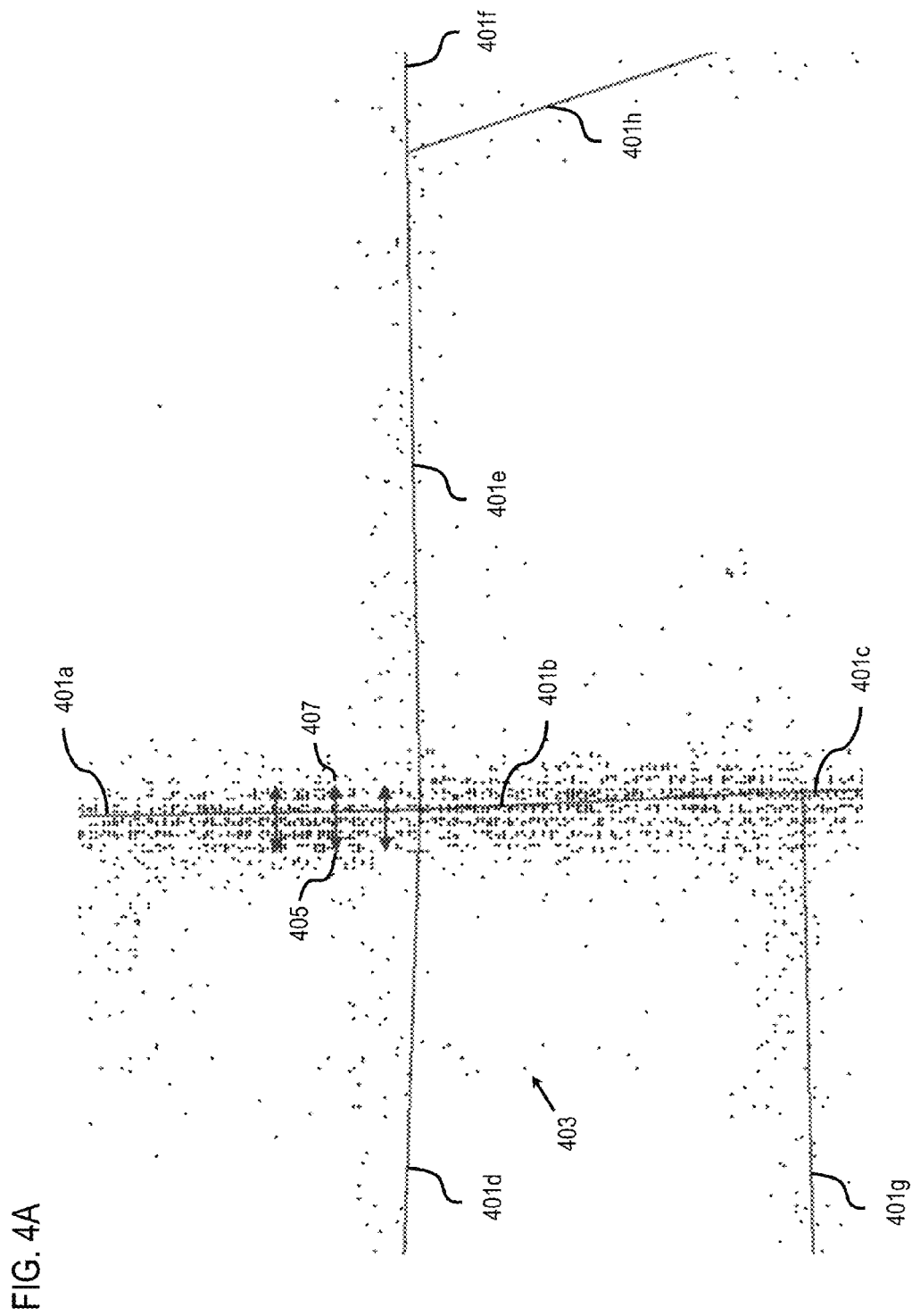

METHOD AND APPARATUS FOR FORMULATING A POSITIONING EXTENT FOR MAP MATCHING

BACKGROUND

Service providers and device manufacturers (e.g., wireless, cellular, etc.) are continually challenged to deliver value and convenience to consumers by, for example, providing compelling network services. Many of these services rely on accurate location information to operate. For example, location-based services such as mapping and navigation traditionally rely on accurate positioning of consumers. Accurate positioning by satellite-based systems is hindered by a variety of errors, including multipath effects induced by signal reflection from surrounding terrain, tall buildings, trees, or other natural or man-made land formations. To accurately match consumers to roads (i.e., map matching), these systems attempt to reposition the inaccurate probe data from a positioning device back to the correct road by assuming a uniform positioning error for the entire system and a constant road width, regardless of lane counts or the actual physical extent of roads in the network. Probe data that does not fall within the assigned road width is considered untrustworthy and is discarded. As such, existing map matching techniques fail to correctly match probe data at points where the probe data is usually inaccurate because they are unable to take local error conditions into account.

SOME EXAMPLE EMBODIMENTS

Therefore, there is a need for an approach for formulating a positioning extent for map matching.

According to one embodiment, a method comprises processing and/or facilitating a processing of a plurality of position data points acquired by at least one positioning system to determine one or more variations in the plurality of position data points with respect to one or more thoroughfare segments. The method also comprises determining one or more positioning extents associated with the one or more thoroughfare segments for the at least one positioning system based, at least in part, on the one or more variations.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of a plurality of position data points acquired by at least one positioning system to determine one or more variations in the plurality of position data points with respect to one or more thoroughfare segments. The apparatus is also caused to determine one or more positioning extents associated with the one or more thoroughfare segments for the at least one positioning system based, at least in part, on the one or more variations.

According to another embodiment, a computer-readable storage medium carries one or more sequences of one or more instructions which, when executed by one or more processors, cause, at least in part, an apparatus to process and/or facilitate a processing of a plurality of position data points acquired by at least one positioning system to determine one or more variations in the plurality of position data points with respect to one or more thoroughfare segments. The apparatus is also caused to determine one or more positioning extents associated with the one or more thoroughfare segments for the at least one positioning system based, at least in part, on the one or more variations.

According to another embodiment, an apparatus comprises means for processing and/or facilitating a processing of a plurality of position data points acquired by at least one positioning system to determine one or more variations in the plurality of position data points with respect to one or more thoroughfare segments. The apparatus also comprises means for determining one or more positioning extents associated with the one or more thoroughfare segments for the at least one positioning system based, at least in part, on the one or more variations.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1B is a diagram of a network representation of thoroughfare mapping information, according to one embodiment;

FIGS. 4A and 4B are diagrams illustrating the formulation of positioning extents associated with a thoroughfare segment, according to an embodiment;

DESCRIPTION OF SOME EMBODIMENTS

Examples of a method, apparatus, and computer program for map matching based on positioning extents are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
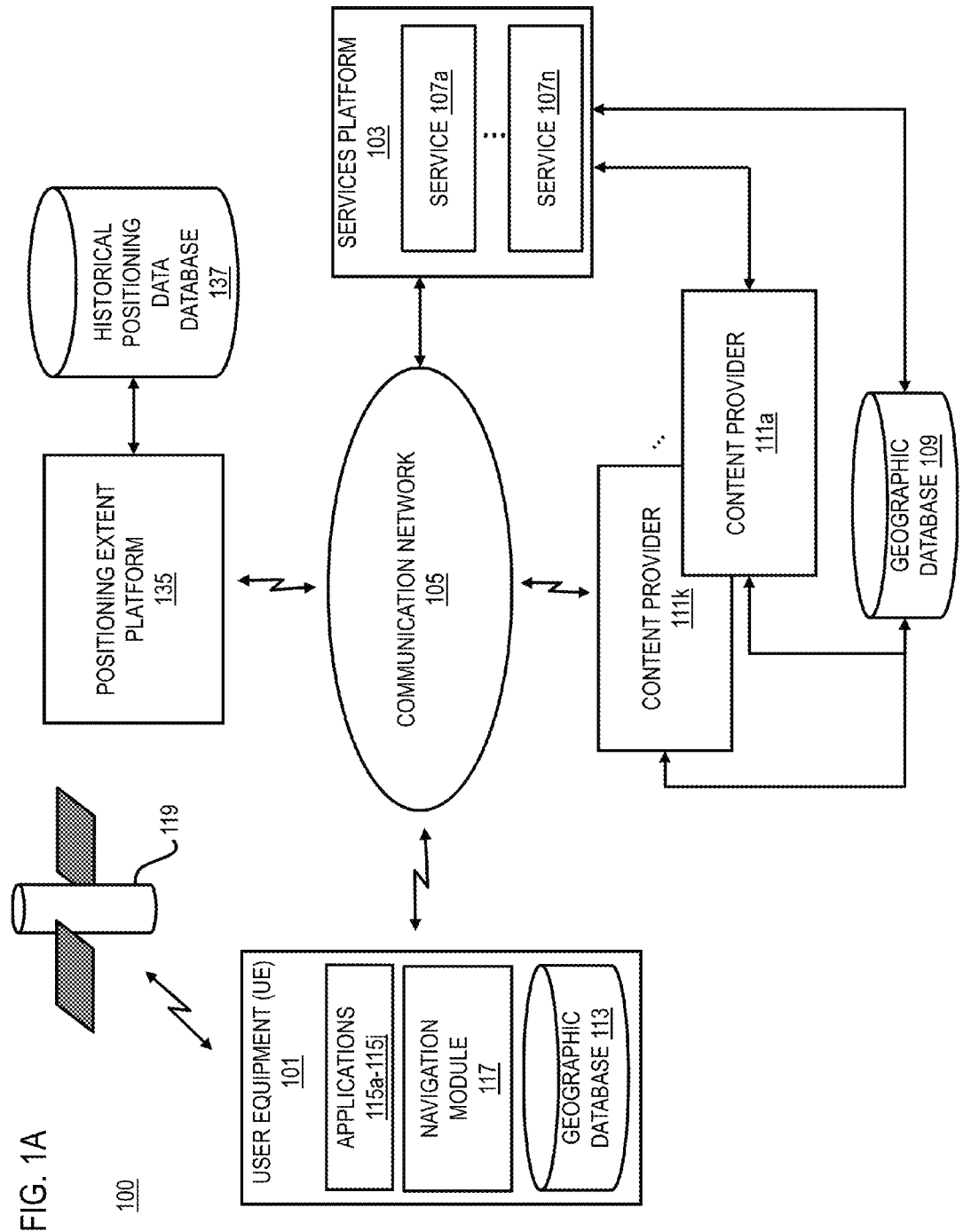
FIG. 1A is a diagram of a system capable of formulating a positioning extent for map matching, according to one embodiment.

FIG. 1A is a diagram of a system capable of formulating positioning extents for map matching, according to one embodiment. As shown in FIG. 1A, the system 100 comprises a user equipment (UE) 101 having connectivity to services platform 103 via communication network 105. In one embodiment, services platform 103 includes one or more services 107a-107n (also collectively referred to as services 107) (e.g., navigation services, media content services, etc.) that provide service functions and/or content using information or data stored in one or more databases. In the case of location-based services, the one or more databases may include geographic database 109.

In one embodiment, geographic database 109 is maintained by one or more content providers 111a-111k (also collectively referred to as content providers 111). A content provider (e.g., content provider 111a) can be a map content provider that provides mapping and location information in the form of geographic database 109. By way of example, content providers 111 may maintain and keep up-to-date geographic database 109.

Figure 1C:
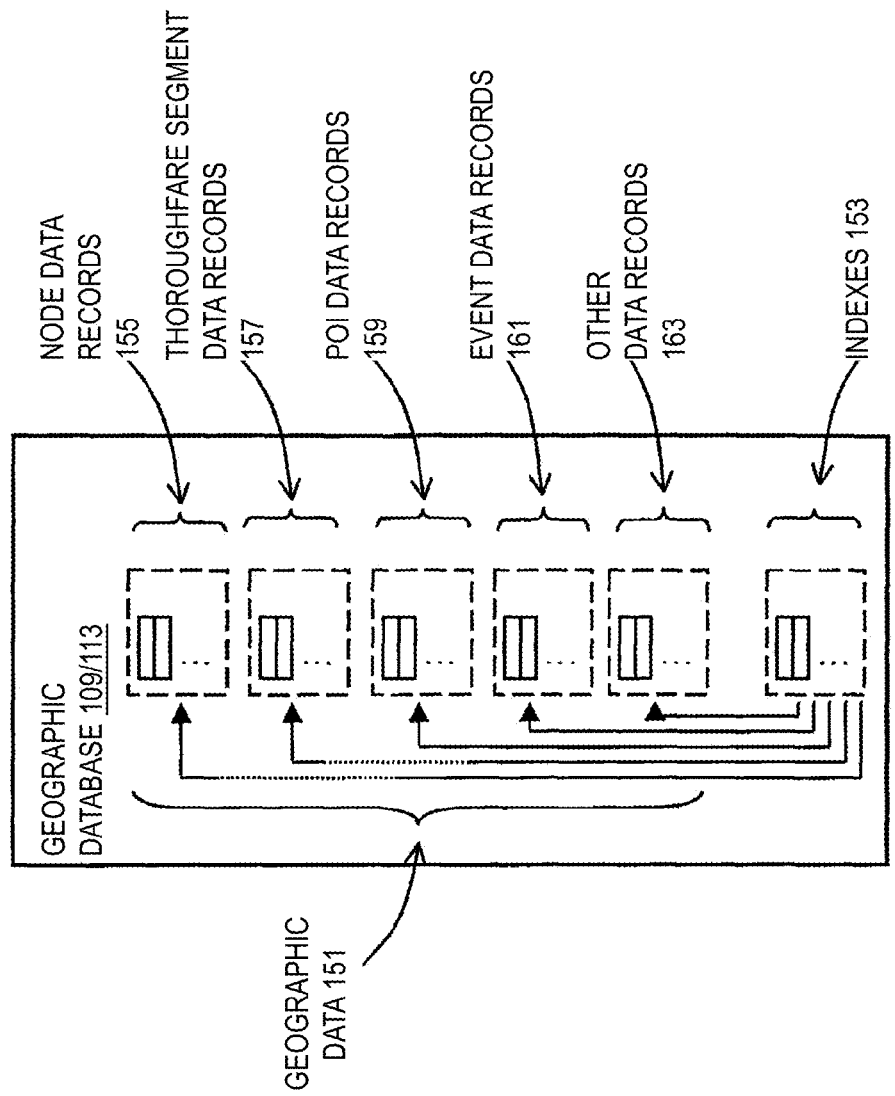
FIG. 1C is a diagram of a geographic database, such as can be included in the system of FIG. 1A, according to one embodiment.

FIG. 1C is a diagram of geographic databases 109/113 of system 100, according to exemplary embodiments. In the exemplary embodiments, mapping data can be stored, associated with, and/or linked to the geographic databases 109/113. In one embodiment, the geographic databases 109/113 include geographic data 151 used for (or configured to be compiled to be used for) mapping and/or navigation-related services, such as for personalized route determination, according to exemplary embodiments. In one embodiment, the geographic databases 109/113 may include one or more indexes 153 for indexing the geographic data 151. By way of example, the geographic databases 109/113 include node data records 155, thoroughfare segment or link data records 157, POI data records 159, event data records 161, and other data records 163. More, fewer or different data records can be provided. In one embodiment, the other data records 163 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the thoroughfare segment data records 157 are links or segments representing roads, streets, or paths, as can be used in the calculated route or recorded route information for determination of one or more personalized routes, according to exemplary embodiments. The node data records 155 are end points corresponding to the respective links or segments of the thoroughfare segment data records 157. The thoroughfare segment data records 157 and the node data records 155 represent a thoroughfare network, such as used by vehicles and/or other entities (e.g., pedestrians, trains, planes, boats, etc.). Alternatively, the geographic database 109/113 can contain path segment and node data records or other data that represent pedestrian paths or areas in addition to or instead of the vehicle road record data, for example.

The thoroughfare/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic databases 109/113 can include data about the POIs and their respective locations in the POI data records 159. The geographic databases 109/113 can also include data about places, such as cities, towns, or other communities, and other geographic features, such as bodies of water, mountain ranges, etc. Such place or feature data can be part of the POI data records 159 or can be associated with POIs or POI data records 159 (such as a data point used for displaying or representing a position of a city). In addition, the geographic databases 109/113 can include event data (e.g., traffic incidents, construction locations, scheduled events, unscheduled events, etc.) associated with the POI data records 159 or other records of the geographic database 109/113.

The geographic databases 109/113 can be maintained by the content provider in association with the services platform 103 and/or content provider 111 (e.g., a map developer). The map developer can collect geographic data to generate and enhance the geographic databases 109/113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic databases 109/113 can be a master geographic database stored in a format that facilitates updating, maintenance, and development. For example, the master geographic databases 109/113 or data in the master geographic databases 109/113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the client side geographic database 113 can represent a compiled navigation database that can be used in or with end user devices (e.g., UEs 101) to provide navigation-related functions. For example, the geographic database 113 can be used with the end user device 101 to provide an end user with navigation features. In such a case, the geographic database 113 can be downloaded or stored on the end user device UE 101, such as in applications 115, or the end user device UE 101 can access the geographic database 109 and/or 113 through a wireless or wired connection (such as via a server and/or the communication network 105), for example.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of one or more personalized routes or route segments based on one or more calculated and recorded routes, according to exemplary embodiments.

In one embodiment, UE 101 is a client of at least one of the services 107 (e.g., a location-based service such as a mapping or navigation service) that depends on the information from the geographic database 109. Accordingly, UE 101 includes a version of all or a portion of geographic database 109 that is stored locally at UE 101 as geographic database 113. By way of example, UE 101 can execute one or more applications 115*a*-115*j* (e.g., client applications of the services 107) to access and/or execute one or more functions associated with the locally stored geographic database 113.

In one embodiment, UE 101 may include navigation module 117 that determines the temporal and spatial position of UE 101 with respect to a thoroughfare network. As used herein, thoroughfare refers to any road, street, or path over which traffic (either vehicular or non-vehicular) can be routed. Navigation module 117 may include various sensors (not shown for illustrative convenience) for detecting the velocity (e.g., odometer) and bearing (e.g., gyrometer) of UE 101. The spatial position of UE 101 may be determined by various positioning systems, including global positioning system (GPS), global navigation satellite system (GLONASS), among others. Thus, navigation module 117 may include a GPS or GLONASS receiver to obtain positioning information from global navigation satellite system 119. It is contemplated that other, non-satellite positioning technologies may also be utilized by navigation module 117 to determine the location of UE 101. For example, navigation module 117 may utilize a cellular network (not shown) to obtain positioning information (e.g., based on triangulation techniques such as multilateration).

Based on the temporal and spatial information obtained from its sensors, navigation module 117 may perform a map matching function. In one embodiment, the map matching function includes determining if the positioning information accurately and reliably indicates that UE 101 lies on a segment of the thoroughfare network. The map matching function takes into account the spatial positioning data obtained from the sensors of navigation module 117 and thoroughfare mapping information obtained from geographic database 109 or 113 to make this determination. In certain embodiments, the map matching function may also take into consideration the velocity and/or bearing information to determine whether to discard unreliable positioning data. For example, probe data that is below a minimum threshold velocity may be discarded because positional accuracy for such data is known to be worse at low speeds. Also, probe data that does not closely track the heading of the thoroughfare network may also be discarded because such data may cause incorrect matching to nearby intersecting thoroughfares.

As shown in FIG. 1B, a thoroughfare network may be modeled in terms of a network of nodes interconnected by centerlines (e.g., centerlines 121) without specifying the physical extent 123 of the thoroughfares. Nodes may include intersection nodes (e.g., intersection node 125) and thoroughfare segment nodes (e.g., thoroughfare segment nodes 127a-127d). The physical extent 123 of a thoroughfare segment may be known by use of LIDAR (Light Detection and Ranging) sensors or from surveying information. In one embodiment, where physical extent information is available, map matching functionality of navigation module 117 can locate UE 101 on a thoroughfare if the probe data point lies within the physical extent 123. However, typically, such information is not available and can be unreliable.

Proximity map matching techniques utilize a rule-based approach by assuming that thoroughfare width is consistently defined throughout the thoroughfare network. For example, proximity map matching techniques may assume an estimated width based on a thoroughfare speed limit (e.g., in the case of vehicular thoroughfares, 10 meters for low speed roads, 20 meters for arteries, and 30 meters for highways). Or, for example, proximity map matching techniques may assume an estimated width based on lane counts (e.g., in the case of vehicular thoroughfares, 3 meters per lane in the United States and 2.5 meters per lane in Europe). Second, proximity map matching techniques may assume that all probe data is uniformly accurate within the stated accuracy of the positioning system (e.g., ten meters for GPS probe data). Based on these or similar assumptions, a safe zone 129 may be generated. Probe data is deemed trustworthy for proximity map matching if it lies within safe zone 129; probe data falling outside of safe zone 129 is discarded as unreliable. For example, probe data point 131 lies within safe zone 129 and, therefore, is matched onto the associated thoroughfare. On the other hand, probe data point 133 lies outside the safe zone and is, therefore, discarded.

As mentioned, probe data is inaccurate due to various environmental and system errors, including communication delays, signaling errors (e.g., multipath effects), as well as measurement errors introduced by components of the positioning system (e.g., atomic clocks aboard satellite positioning systems). Existing map matching techniques filter and discard any probe data that lies beyond a constant threshold distance from a thoroughfare segment. However, uniformly applied assumptions about system accuracy and thoroughfare width frequently cause proximity map matching techniques to incorrectly discard probe data when those assumptions do not reflect local sources of positioning error and actual physical thoroughfare width. For example, a constant thoroughfare width assumption in the case of vehicular thoroughfares is at least problematic because road widths vary in practice. Higher capacity roads have more lanes and lanes are sometimes added or dropped near or between intersections. Thoroughfare networks for non-vehicular traffic present similar challenges to proximity map matching techniques.

To address these challenges, system 100 of FIG. 1A introduces the capability to perform map matching based on formulating positioning extents that take into consideration local variations in positioning data error and flexibly vary a threshold distance for discarding probe data via positioning extent platform 135 and historical positioning data database 137. Thus, system 100 does not make uniform assumptions regarding the accuracy of positioning data or the extents of physical features. Instead, it relies on a data-driven modeling of the extent of a thoroughfare network to take into account local variations in probe data. A modeled network of positioning extents allows system 100 to reflect changes in the physical topography and flexibly vary a threshold distance. The positioning extent platform 135 may process historical positioning data acquired by a positioning system to determine one or more variations in the historical positioning data with respect to one or more thoroughfare segments. In one embodiment, positioning extent platform 135 may acquire the historical positioning data from historical positioning data database 137 and may obtain mapping information for the one or more thoroughfare segments from geographic databases 109/113. Next, the positioning extent platform 135 may determine one or more positioning extents associated with the one or more thoroughfare segments for the positioning system based, at least in part, on the one or more variations. The resulting positioning extents take into consideration local variations in positioning data error and, therefore, allow for varying a threshold distance for discarding probe data with respect to segments of a thoroughfare network.

In one embodiment, the positioning extent platform 135 may determine at least one centerline for the respective segments of the one or more thoroughfare segments. In one embodiment, positioning extent platform 135 may use the mapping information obtained from geographic databases 109/113 to determine the centerlines. The positioning extent platform 135 may then process the historical positioning data to determine one or more threshold distances with respect to each of the centerlines. In one embodiment, the one or more variations may be based, at least in part, on the historical positioning data that lies within the at least one threshold. In one embodiment, the one or more threshold distances may include a left and a right positioning extent with respect to each of the one or more centerlines. In one embodiment, the one or more threshold distances are based on a statistical average of the position of historical positioning data.

In one embodiment, the positioning extent platform 135 may determine one or more positioning errors for the respective segments of the one or more thoroughfare segments based on the historical positioning data. In one embodiment, the positioning error may allow positioning extent platform 135 to reposition inaccurate probe data back to its actual position. In one embodiment, the one or more variations are based, at least in part, on one or more position data points associated with a thoroughfare segment. In one embodiment, probe data from UE 101 may be repositioned to determine its actual position. Thus, positioning extent platform 135 may allow UE 101 to obtain its actual position by correcting for the positioning error caused by positioning system inaccuracy and local factors (e.g., tall buildings, extensive tree canopies, etc.).

In one embodiment, the positioning extent platform 135 may determine a correlation of the respective positioning extents associated with the one or more thoroughfare segments based on a size of one or more physical structures proximate to the one or more thoroughfare segments. Positioning extent platform 135 may analyze the relationship between the size of buildings and various statistical measures of the historical positioning data for one or more thoroughfare segments. In one embodiment, information regarding the size of various physical structures proximate to a thoroughfare segment may be obtained from the geographic databases 109/113. Based on this analysis, positioning extent platform 135 may determine a degree of correlation between the size of the buildings (or other natural and man-made structures). This correlation may be used to predict a positioning extent for a thoroughfare segment for which there is insufficient historical positioning data. In one embodiment, positioning extent platform 135 may utilize the correlation to determine a positioning extent for a thoroughfare segment for which the amount of historical positioning data is less than a minimum threshold value.

In one embodiment, positioning extent platform 135 may determine an intersection extent associated with the intersection of two or more thoroughfare segments based, at least in part, on an intersection of two or more positioning extents of the two or more intersecting thoroughfare segments. In one embodiment, positioning extent platform 135 may obtain mapping information for an intersection from geographic databases 109/113. Positioning extent platform 135 may form the intersection extent by connecting the points at which the positioning extents of adjacent intersecting thoroughfare segments intersect, as discussed in detail with respect to FIG. 7.

In one embodiment, the one or more positioning extents for the one or more thoroughfare segments may include a vertical positioning extent above the one or more thoroughfare segments. In one embodiment, positioning extent platform 135 may determine the vertical positioning extent based on altitude information associated with the historical positioning data for the one or more thoroughfare segments.

Figure 6:
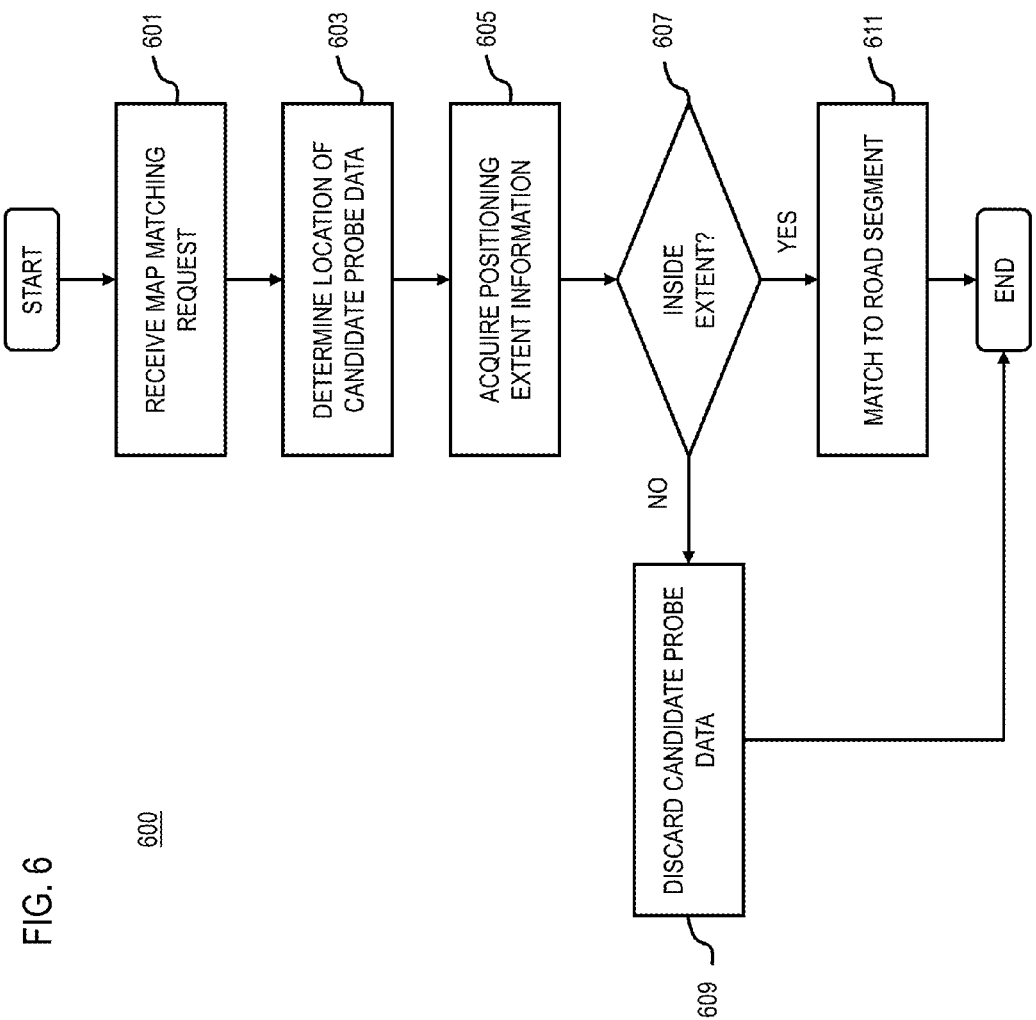
FIG. 6 is a flowchart of a process for map matching based on a formulated positioning extent, according to one embodiment.

In one embodiment, positioning extent platform 135 may match a probe data point obtained from UE 101 to at least one thoroughfare segment based, at least in part, on whether the probe data point is within a respective positioning extent of the at least one thoroughfare segment, as discussed in detail with respect to FIG. 6. In one embodiment, UE 101 may also be capable of matching its probe data to a thoroughfare segment based on whether the probe data point lies within the positioning extent for the thoroughfare segment (as determined by positioning extent platform 135). In another embodiment, probe data points may also be matched to thoroughfare segments based on associated positioning extent information by services 107 on the services platform 103.

By way of example, UE 101, services platform 103, services 107, content providers 111, applications 115, and positioning extent platform 135 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the applications 115 and the services 107 can interact according to a client-server model, for example. It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
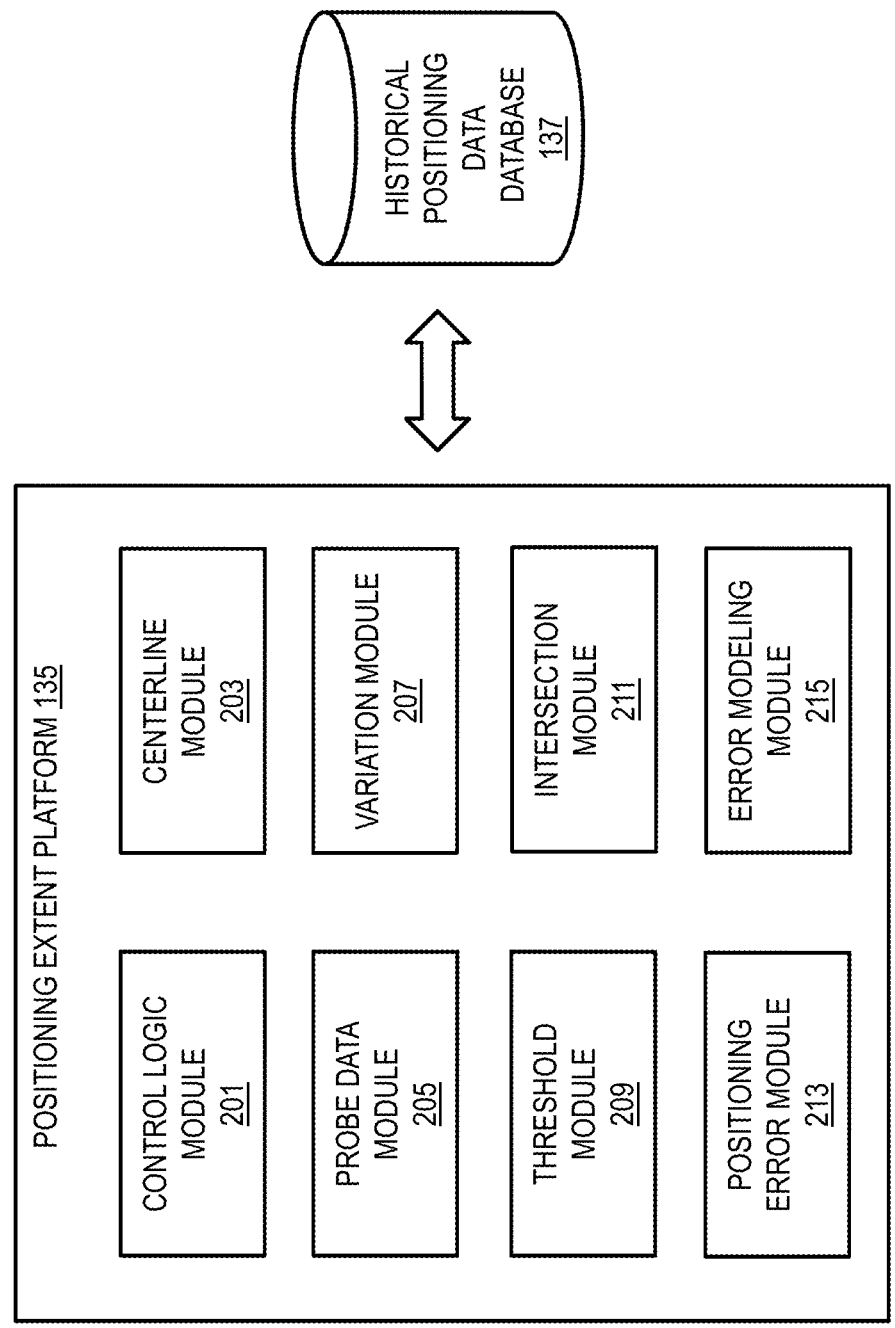
FIG. 2 is a diagram of the components of positioning extent platform, according to one embodiment.

FIG. 2 is a diagram of the components of positioning extent platform 135, according to one embodiment. By way of example, the positioning extent platform 135 includes one or more components for determining positioning extents. It is contemplated that the functions of these components may be combined in one or more components or performed by other components of equivalent functionality. In this embodiment, the positioning extent platform 135 includes control logic module 201, centerline module 203, probe data module 205, variation module 207, threshold module 209, intersection module 211, positioning error module 213, and error modeling module 215. In one embodiment, as shown, positioning extent platform 135 may be connected to, or include, historical positioning data database 137.

In one embodiment, control logic module 201 may use centerline module 203 to determine one or more centerlines corresponding to links of a thoroughfare network for which a positioning extent is to be formulated. Centerline module 203 may determine the centerline corresponding to a link based on mapping data obtained from a geographic database. In one embodiment, centerline module 203 may query geographic database 109 to obtain thoroughfare segment data records 157 and node data records 155. A centerline for a particular thoroughfare segment may be determined as the line connecting the corresponding nodes. In another embodiment, centerline module 203 may determine a centerline for thoroughfare segments of arbitrary length. For example, the centerlines of thoroughfares entering an intersection may be determined for a distance of 50 meters from the intersection node.

In one embodiment, control logic module 201 may use centerline module 203 to determine a shifted centerline (as opposed to the centerline determined from road mapping information) if historical positioning data database 137 indicates that most of the historical positioning data lies on one side of the centerline (hereinafter "original centerline"). This may happen if, for example, the mapping information is incorrect or has become outdated due to changes in the physical extent of the thoroughfare segment. In one embodiment, centerline module 203 may determine the shifted centerline to lie at a distance based on a statistical average of the distance to the original centerline.

In one embodiment, control logic module 201 may use probe data module 205 to acquire historical positioning data associated with one or more specified thoroughfare segments from historical positioning data database 137. The historical positioning data thus obtained may span years of recorded positioning data received from a wide range of devices utilizing location-based services (e.g., mapping and navigation services). Control logic module 201 may also use probe data module 205 to filter the acquired historical positioning data based on associated bearing and speed probe data attributes. For example, probe data module 205 may discard any data that does not have, or does not lie within a fixed tolerance of, the heading of the thoroughfare. Probe data module 205 may also discard any historical positioning data below a certain speed (e.g., 15 miles per hour (mph)) because position and heading information at low speeds is frequently inaccurate based on various positioning systems.

In one embodiment, control logic module 201 may also use probe data module 205 to sort the acquired historical positioning data into two groups depending on which side of the centerline (as determined by centerline module 203) the data belonging to a thoroughfare segment lies. A first group may include the historical positioning data that lies on the right side of the centerline and a second group may include the historical positioning data that lies on the left side of the centerline. There may be instances where all or most of the acquired historical positioning data lies on one side of the centerline in which case a new shifted centerline will have been determined by centerline module 203. In such instances, probe data module 205 will sort the historical positioning data with respect to the shifted centerline.

It is contemplated that any source of historical probe data may be utilized to formulate a positioning extent of a thoroughfare network. In one embodiment, control logic module 201 may use probe data module 205 to filter the historical probe data according to data provider (e.g., Nokia, Garmin), device type (handheld, integrated), device model (as determined by a manufacturer), or device quality (e.g., low cost versus high cost). Probe data module 205 may also be used to determine whether the quantity of historical positioning data for a particular thoroughfare segment is greater than a threshold. For example, probe data module 205 may indicate to control logic module 201 that there is insufficient positioning data to formulate an extent of a particular thoroughfare segment if the number of probe data points is less than ten for that segment. Probe data module 205 may then trigger control logic module 201 to rely on a default proximity map matching technique if insufficient data is available.

In one embodiment, control logic module 201 may use variation module 207 to determine one or more variations of the historical positioning. Variation module 207 may provide control logic module 201 the capability to statistically measure the spread of historical positioning data for one or more thoroughfare segments. In one embodiment, variation module 207 may determine the standard deviation of the historical positioning data with respect to the respective centerlines of the thoroughfare segments. In another embodiment, variation module 207 may determine an average or mean positioning error of individual data points.

In one embodiment, control logic module 201 may use threshold module 209 to determine one or more positioning extent thresholds based on various statistical measures of the historical positioning data. Threshold module 209 may analyze the historical data for a specific thoroughfare segment to determine its standard deviation, mean, and/or median values with respect to its centerline. In one embodiment, threshold module 209 may assume that the distribution of the historical positioning data is Gaussian, but it is contemplated that other distribution functions may alternatively be assumed in various other embodiments of the present disclosure.

In one embodiment, control logic module 201 may use intersection module 211 to determine the positioning extent of an intersection plaza based on the formulated positioning extent of one or more thoroughfare segments entering an intersection. As used herein, an intersection plaza refers to an area of an intersection where one or more roads cross. As in the case of physical thoroughfare extents, proximity map matching techniques may incorrectly discard probe data because of local sources of positioning error and/or changes to the physical features of the intersection. For example, tall buildings may induce a multipath effect. Or, the physical extent of thoroughfare segments entering the intersection may have changed over time and, as a result, the physical extent of the intersection may have also been enlarged or reduced in size.

In one embodiment, intersection module 211 formulates a positioning extent of an intersection plaza by determining the vertices of the extent of an intersection polygon. The extent of an intersection polygon may be determined as the boundaries of a polygon whose vertices are formed by intersection of positioning extents of the thoroughfares entering the intersection. In one embodiment, control logic module 201 causes intersection module 211 to determine the extent of an intersection plaza after the positioning extents of thoroughfare segments entering the intersection have been determined by centerline module 203, probe data module 205, variation module 207, and threshold module 209. For example, control logic module 201 may cause intersection module 211 to obtain a left and right threshold distance (as determine by threshold module 209) for each of the centerlines (as determined by centerline module 203) connecting on one side to the intersection node. In one embodiment, intersection module 211 may then formulate an extent for the intersection plaza, as described in more detail with respect to the process illustrated in FIG. 5.

In one embodiment, control logic module 201 may use positioning error module 213 to determine an estimate of positioning error along different points in a thoroughfare network. As used herein, positioning error refers to inaccuracies in actual position. The positioning error for a particular thoroughfare segment may be caused by nearby natural (e.g., tree canopies) or man-made (e.g., tall buildings) topographical features, or may be the result of positioning system inaccuracies (e.g., satellite visibility, quality of signal, etc.). Existing map matching techniques rely on proximity matching in part because local estimates of positioning error are unavailable to reposition probe data points back to their actual position. In one embodiment, control logic module 201 uses positioning error module 213 to derive estimates of local positioning error based on various statistical measures of the average spread of historical positioning data at a particular thoroughfare segment. Positioning extent platform 135 may then use the estimated local positioning error to reposition probe data points to their actual position.

In one embodiment, control logic module 201 may use error modeling module 215 to derive a model for positioning error at locations with insufficient historical positioning data. Error modeling module 215 may derive such a model based on determining correlations between the presence and size of nearby topographical features (e.g., tall buildings, extensive tree canopy, etc.) and the amount of spread of the historical positioning data for the associated road segment. In one embodiment, error modeling module 215 may determine such models by iteratively refining an initial estimate for the degree of correlation. Positioning extent platform 135 may then use the error model to predict a positioning extent for the thoroughfare segment.

Figure 3A:
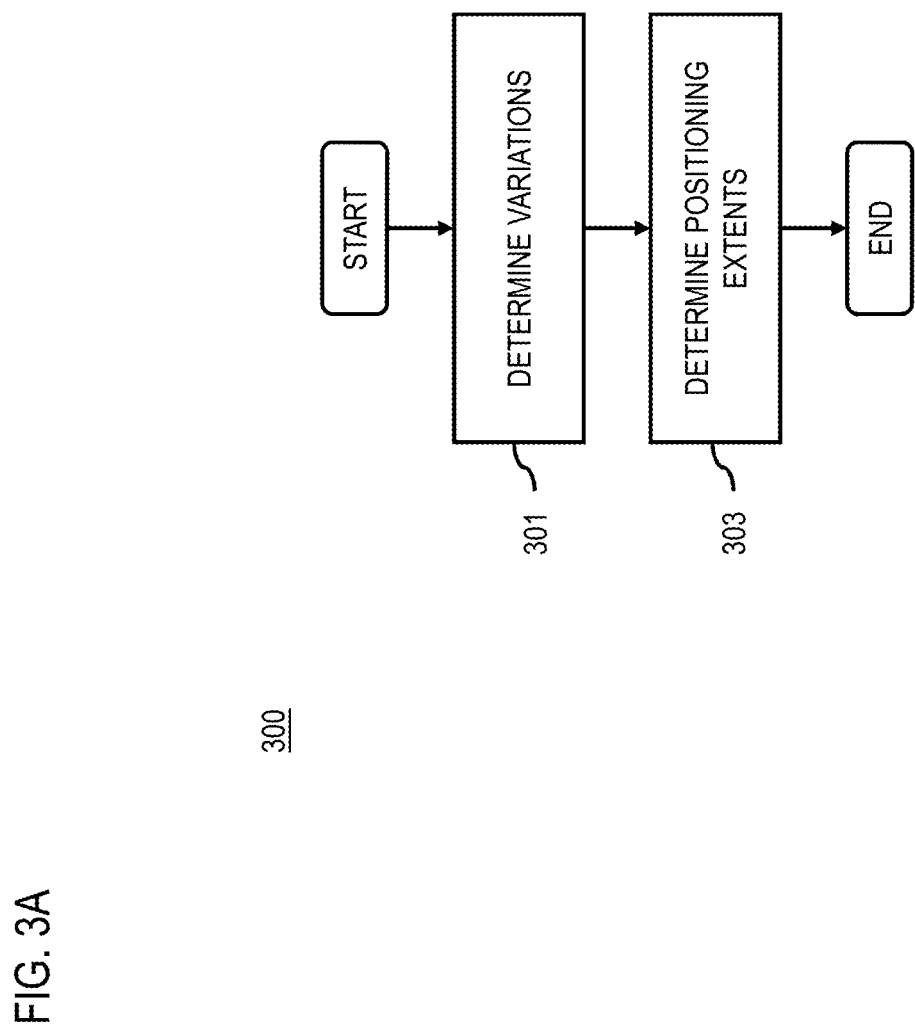
FIG. 3A is a flowchart of a process for formulating positioning extents, according to one embodiment.
Figure 10:
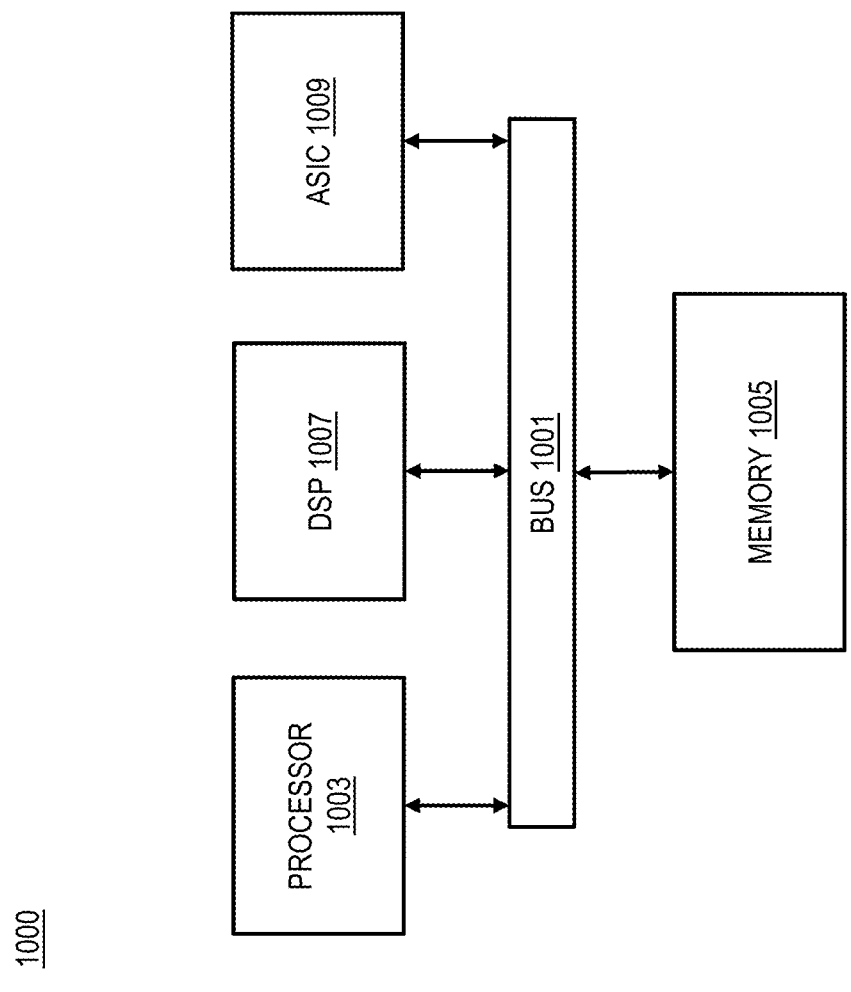
FIG. 10 is a diagram of a chip set that can be used to implement an embodiment of the invention.

FIG. 3A is a flowchart of a process 300 for formulating a positioning extent, according to one embodiment. In one embodiment, the positioning extent platform 135 performs the process 300 and is implemented in, for instance, a chip set including a processor and a memory as shown in FIG. 10.

In step 301, historical positioning data acquired by at least one positioning system is analyzed to determine one or more variations with respect to one or more thoroughfare segments. A thoroughfare segment may include the entire length of a link in the thoroughfare network, or it may be shorter sub-section of a link depending on the scale at which variations are analyzed. In one embodiment, step 301 may involve applying various statistical measures of the dispersion of the historical positioning data with respect to a centerline of the thoroughfare segment. In another embodiment, step 301 may involve estimating the positioning error at different portions of a thoroughfare segment.

In step 303, a positioning extent may be determined with respect to the thoroughfare segments. In one embodiment, step 303 may involve determining a threshold value based on the percentile distribution of the historical positioning data at the thoroughfare segment. Positioning extent may be determined with respect to the centerline of the thoroughfare segment. However, it is contemplated that positioning extents may also be determined with respect to other positions on a map. It is further contemplated that the positioning extent may be determined with respect to any direction (including vertically) for which positioning data is available. The resulting positioning extents take into consideration local variations in the positioning system to allow for varying a threshold distance for discarding probe data with respect to segments of a thoroughfare network.

Figure 3B:
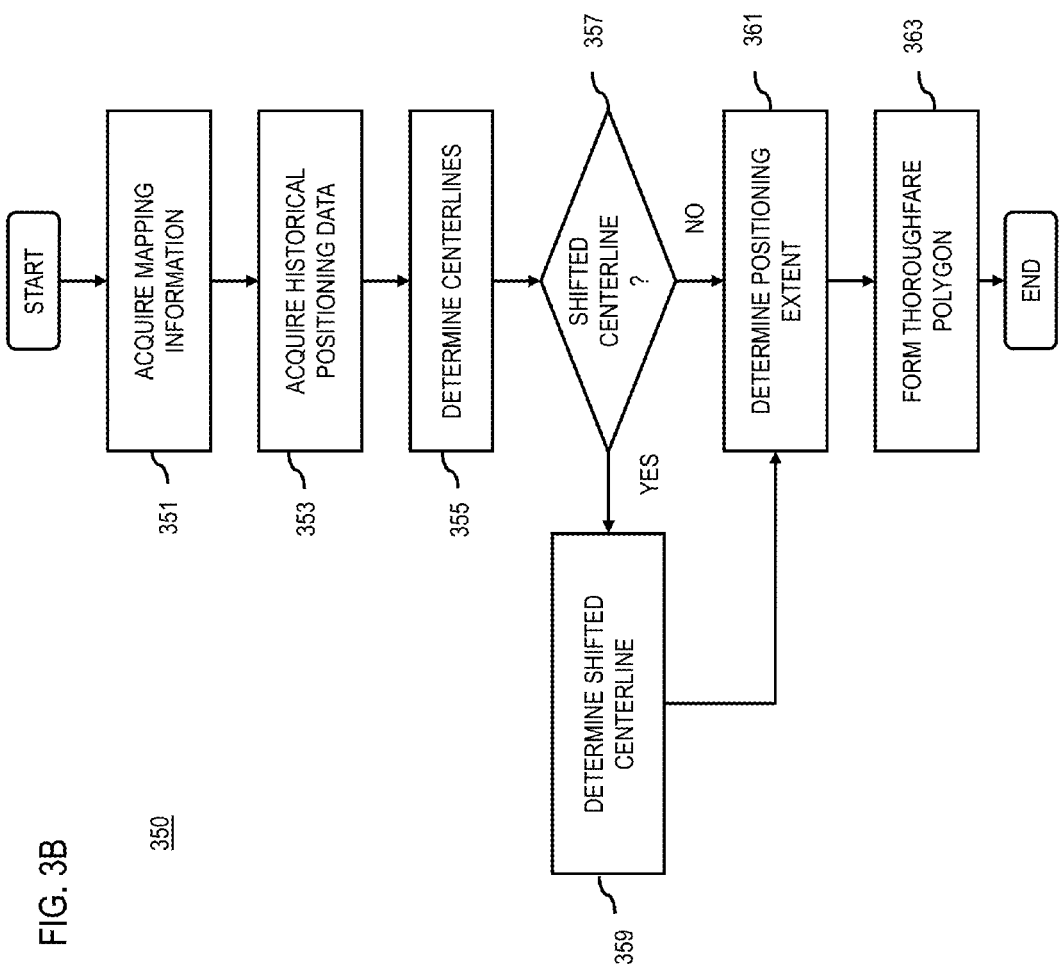
FIG. 3B is a flowchart of a more detailed process for formulating positioning extents, according to one embodiment.

FIG. 3B is a flowchart of a more detailed process 350 for positioning extent formulation, according to one embodiment. In one embodiment, the positioning extent platform 135 performs the process 350 and is implemented in, for instance, a chip set including a processor and a memory as shown in FIG. 10.

In step 351, geographic mapping information for a thoroughfare network is acquired. This may include a network representation of the thoroughfare network in terms of a set of arcs and nodes. The nodes may be intersection nodes (where two or more arcs meet) or intermediate shape points along an arc. In one embodiment, the geographic mapping information is acquired from the geographic databases 109/113 and includes thoroughfare segment data records 157 and node data records 155.

In step 353, historical positioning data for one or more thoroughfare segments of the thoroughfare network is acquired. The historical positioning data may have originated from a diverse set of probe devices and recorded by the positioning system over a period of several years. In one embodiment, step 353 may involve filtering the historical positioning data based on a specified period and set of devices. It is contemplated that various other filters may be applied to further refine the data set thus obtained. For example, step 353 may also request that the historical positioning data not include low speed data or probe data that does not conform to the heading of the thoroughfare segment.

In step 355, one or more centerlines of the thoroughfare network are determined based on the mapping information acquired in step 351. In one embodiment, the centerlines correspond to the set of arcs representing the thoroughfare network. In this embodiment, the centerlines (hereinafter "original centerlines") are straight lines connecting the intersection nodes and shape points.

In step 357, the historical positioning data is analyzed to determine if one or more of the centerlines determined in step 357 should be shifted. In one embodiment, step 357 may involve determining if all or most of the historical positioning data for one or more thoroughfare segments lies on one side of the original centerline. If so, process 300 proceeds to step 359. Otherwise, process 300 continues to step 361.

In step 359, a shifted centerline is determined. In one embodiment, step 359 may involve determining a shifted centerline at a parallel offset to the original centerline. The offset distance may be configured based on one or more statistical measures of the mean or median displacement of the historical positioning data from the original centerline. In one embodiment, the offset is equal to a statistical average of the displacement of historical positioning data with respect to the original centerline.

In step 361, a positioning extent is determined for one or more thoroughfare segments of the thoroughfare network. Step 361 may involve statistically analyzing the distribution of the historical positioning data with respect to the centerline (either as determined in step 355 or step 359). In one embodiment, step 361 may involve determining a threshold percentile value (e.g., the eighty-fifth percentile) for a distribution of perpendicular distances to the centerline. In one embodiment, step 361 may further involve determining a left and right side positioning extent with respect to the centerline. For example, the eighty-fifth percentile value of the perpendicular distance to the centerline may be determined based on the respective historical positioning data. The left and right side positioning extents may subsequently be applied as left and right threshold values during map matching. It is contemplated that the specific percentile value may be configured to match more or less probe data to the thoroughfare network as needed. It is contemplated that the historical positioning data may also be analyzed to determine a vertical positioning extent. In one embodiment, step 361 may involve determining a threshold percentile value (or other statistical measure) of the distribution of positioning data with respect to altitude.

In step 363, a thoroughfare polygon is formed based on the centerline and positioning extent determined in respective steps 355 (or step 359) and step 361. As used herein, thoroughfare polygon refers to a geometric representation of the positioning extent with respect to a thoroughfare segment. In one embodiment, a thoroughfare polygon may be represented by a rectangle the width of which is equal to the sum of the left and right threshold distances and the length of which is equal to the length of the thoroughfare segment. In an embodiment in which a vertical positioning extent is determined in step 361, the thoroughfare polygon may be a vertical plane with a normal coincident with the centerline.

Figure 3C:
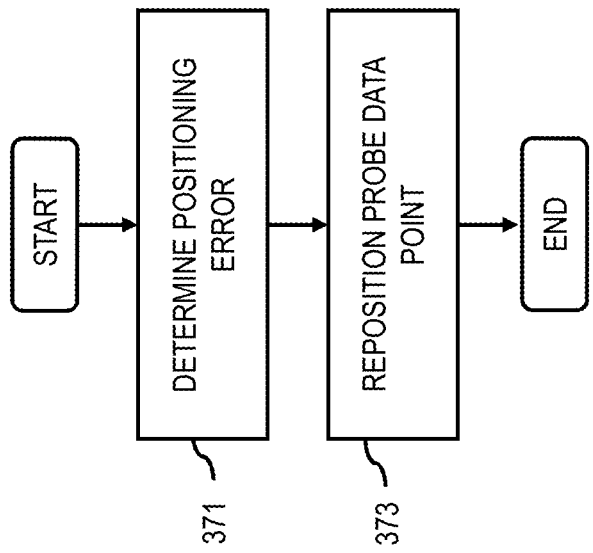
FIG. 3C is a flowchart of a process for formulating a positioning error, according to one embodiment.

FIG. 3C is a flowchart of a process 370 for positioning error formulation, according to one embodiment. In one embodiment, the positioning extent platform 135 performs the process 370 and is implemented in, for instance, a chip set including a processor and a memory as shown in FIG. 10.

In step 371, a positioning error is determined for one or more thoroughfare segments. As used herein, positioning error refers to inaccuracies in actual position of the probe data originating from a particular thoroughfare segment. These inaccuracies may be caused by various local factors, including nearby natural or man-made structures. They may also be the result of factors affecting the accuracy of the positioning system at a particular location (e.g., satellite visibility, quality of signal, etc.). In one embodiment, step 371 may involve positioning extent platform 135 analyzing the historical positioning data for the location to determine an estimate for the positioning error. In one embodiment, positioning extent platform 135 may determine various statistical measures of the distribution of historical positioning data and correlate these measures to the presence of the sources of error. It is contemplated that the positioning error determined in step 371 may include a positioning error for any direction, including a vertical direction.

In step 373, probe data points may be repositioned to their actual position based on the determined positioning error. In one embodiment, positioning extent platform 135 may correct the raw probe data obtained from UE 101 by compensating for the positioning error. The corrected probe data points may or may not indicate that the repositioned UE 101 lies on the thoroughfare segment. In one embodiment, positioning extent platform 135 may determine whether UE 101 lies on the thoroughfare segment based on a positioning extent.

Figure 4B:
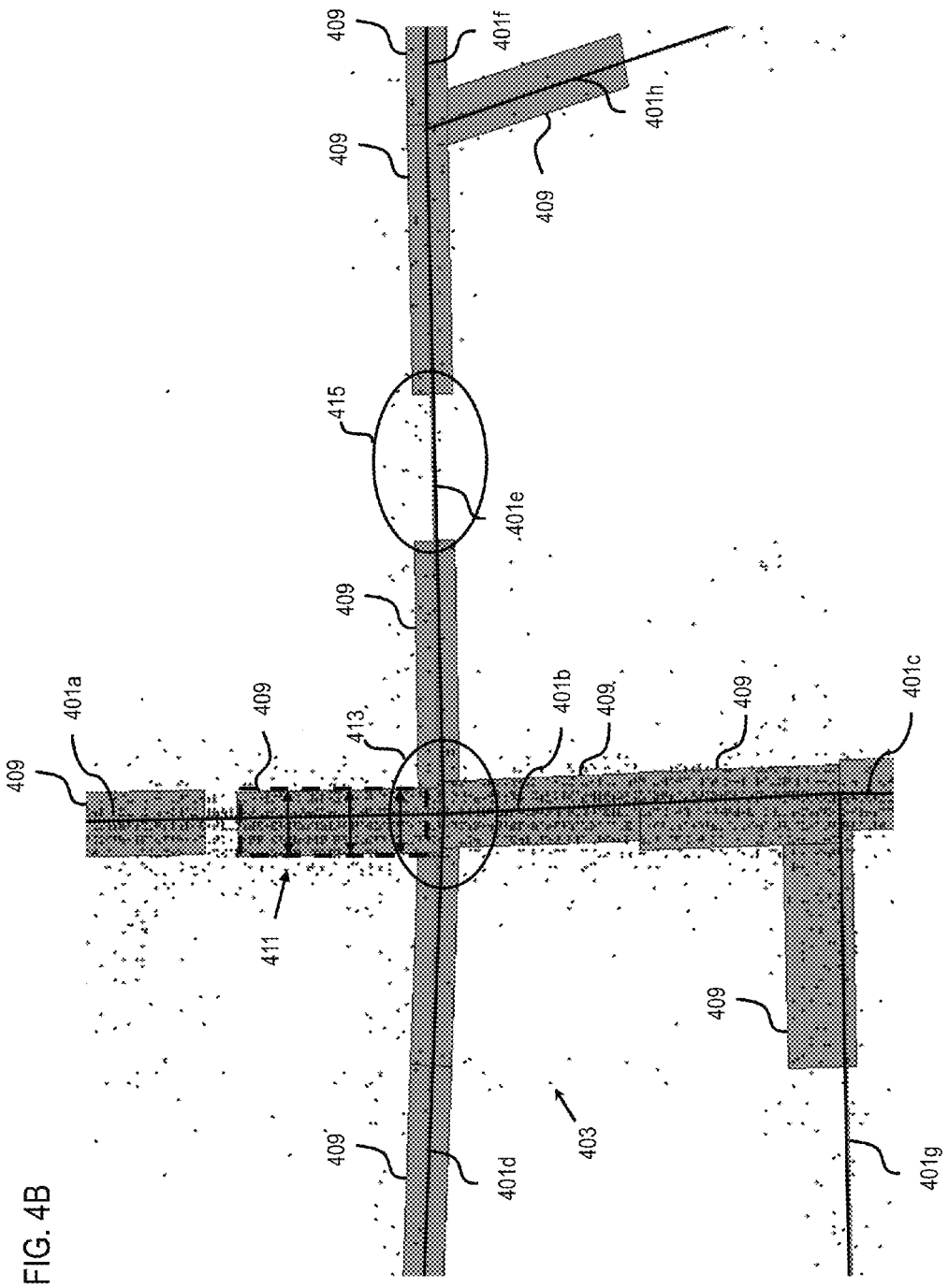

FIGS. 4A and 4B are diagrams illustrating the formulation of positioning extents associated with a thoroughfare segment, according to an embodiment.

FIG. 4A illustrates a map view of a thoroughfare network as represented by centerlines 401a-401h (collectively referred to as centerlines 401). As shown, the historical positioning data for the various road segments is distributed in the general vicinity of each of the centerlines 401. The set of historical probe data points 403 include positioning data recorded by the positioning system over an extended period of time. Each probe data point may include, in addition to its positioning information, various attributes such as speed (high or low speed) and device information (e.g., make, model, quality). As used herein, historical positioning data refers to all recorded positioning data for any location in the vicinity of the road network regardless of the existence of any temporal relationship between individual probe data points. Depending on the relative dispersion of historical probe data points 403, this value may be different for the two sides of a centerline. For example, as shown in FIG. 4A, the eighty-fifth percentile value 405 (as indicated by the arrow on the left) of the historical probe data on the left side of centerline 401a is greater than the eighty-fifth percentile value 407 (as indicated by the arrow on the right) on the right side of centerline 401a.

FIG. 4B illustrates a map view of the road network in FIG. 4A after forming thoroughfare polygons representing positioning extents 409. As used herein, thoroughfare polygon refers to an illustrative indication of the positioning extent of a thoroughfare segment. For example, thoroughfare polygon 411 extends along centerline 401a in the form of a dashed rectangle the width of which may be shown to be the sum of the left 405 and right 407 percentile values. At intersection 413, the thoroughfare polygons partially extend into the intersection and overlap each other. As further shown, certain portions of the thoroughfare network (e.g., portion 415) may not have a positioning extent if, for example, the number of nearby historical probe data points 403 is insufficient.

Figure 5A:
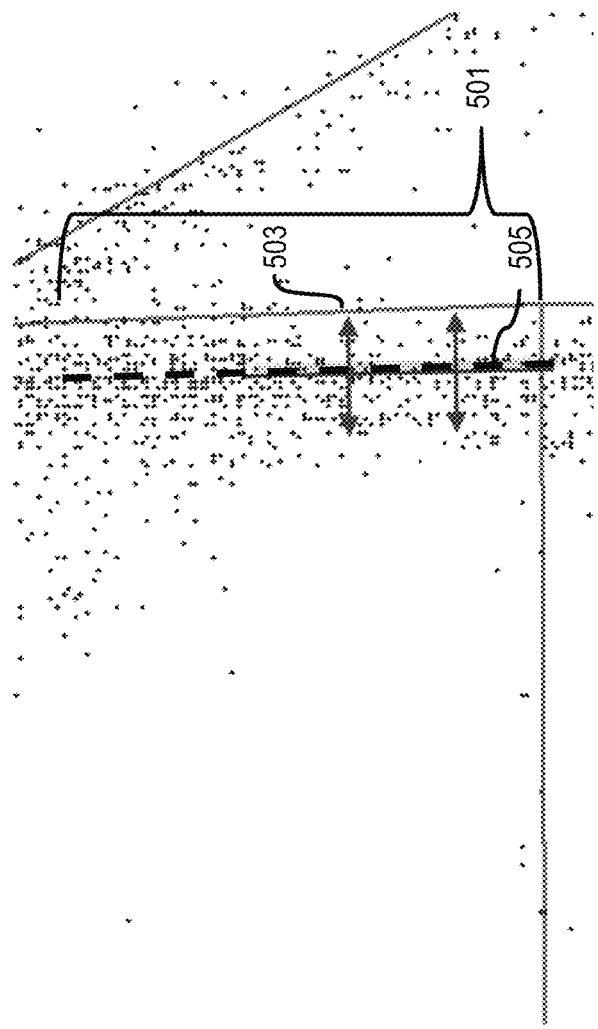
FIGS. 5A and 5B are diagrams illustrating the formulation of positioning extents for a thoroughfare segment with a shifted centerline, according to an embodiment.
Figure 5B:
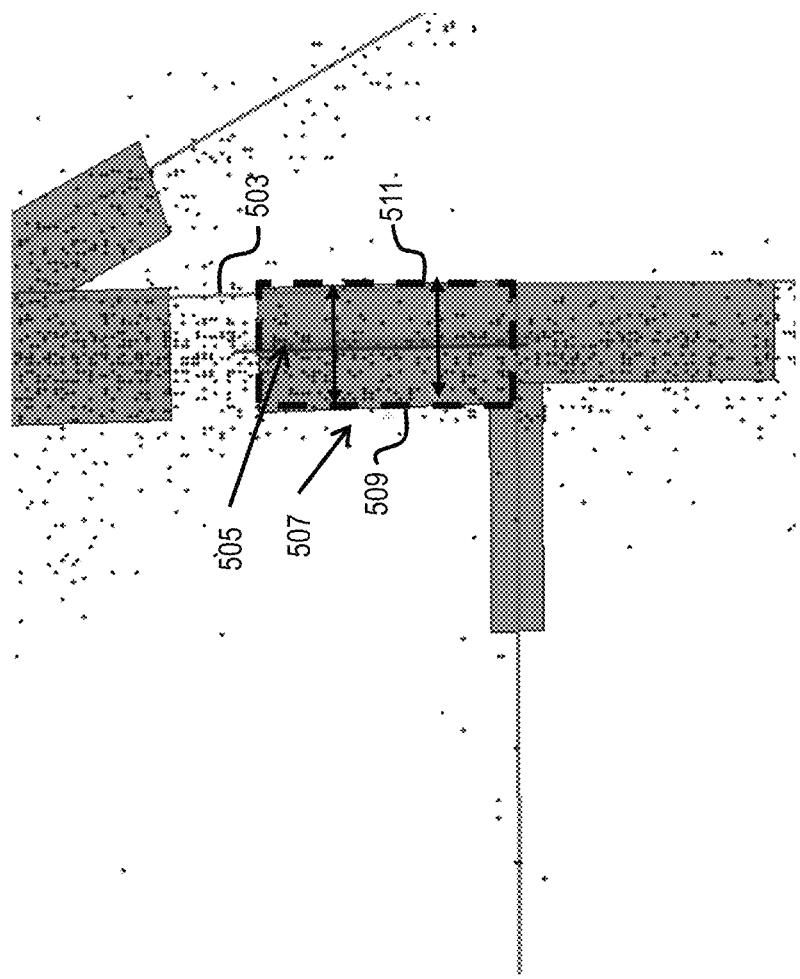

FIGS. 5A and 5B illustrate the formulation of positioning extents associated with a thoroughfare network with a shifted centerline, according to an embodiment.

FIG. 5A illustrates a map view of a thoroughfare segment for which the historical positioning data indicates a shifted centerline. As shown, most or nearly all the probe data points for thoroughfare segment 501 lie to the left of centerline 503 (hereinafter "original centerline 503"). This may be the result of changes to the physical extent of thoroughfare segment 501 that are not reflected by the latest available mapping information. For example, thoroughfare segment 501 may have been expanded to include more lanes on the left side or have been moved from its earlier position. In such a scenario, a new shifted centerline 505 may be obtained by calculating the average distance of probe data points from original centerline 503 and establishing shifted centerline 505 at that distance. The left and right side positioning extents for thoroughfare segment 501 will, therefore, be calculated with respect to shifted centerline 505 instead of original centerline 503.

FIG. 5B illustrates a map view of the road network in FIG. 5B after forming thoroughfare polygon 507 based on shifted centerline 505. As shown, the left side 509 and the right side 511 of thoroughfare polygon 507 are formed at the corresponding positioning extents for the thoroughfare segment.

FIG. 6 is a flowchart of a process for map matching based on formulated positioning extents, according to one embodiment. Process 600 may be implemented either at UE 101 in FIG. 1 or at positioning extent platform 135. In the former case, navigation module 117 performs process 600 after positioning extent has been determined by positioning extent platform 135 according to process 300 or 350. In another embodiment, process 600 may be implemented by an integrated map matching module in positioning extent platform 135. The map matching module may receive location information from UE 101 and may then attempt to match UE 101 to the thoroughfare network. In either case, process 600 is implemented in, for instance, a chip set including a processor and a memory as shown in FIG. 10.

In step 601, a map matching request is received from UE 101. The map matching request includes probe data for UE 101 (obtained by UE 101 from navigation module 117). In step 603, the location of UE 101 is determined corresponding to the probe data associated with the request received in step 601. Next, in step 605, positioning extent information for the one or more thoroughfare segments in the vicinity of UE 101 is acquired. In step 607, the location of UE 101 and the positioning extent information are compared to determine whether UE 101 lies within the positioning extent (as represented by thoroughfare polygons 411 and 507 in FIGS. 4B and 5B, respectively). If, as in step 609, UE 101 is found to not lie within the positioning extent (e.g., NO at 607), the probe data is discarded and no match is reported and the process ends (or repeats with another request). If, on the other hand, as in step 611, UE 101 is determined to lie within the positioning extent (e.g., YES at 607), UE 101 is mapped to the corresponding thoroughfare segment and the process ends (or repeats with another request).

Figure 7:
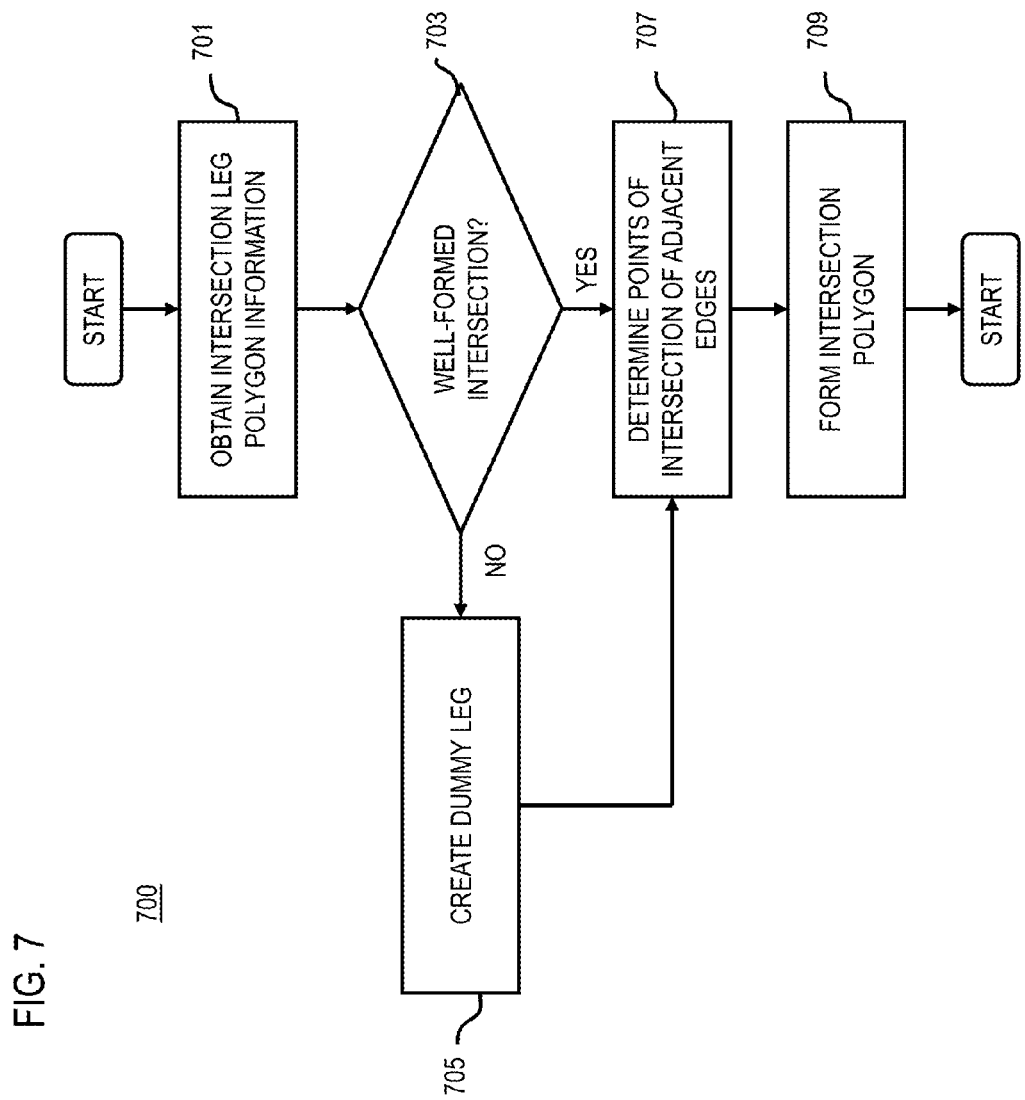
FIG. 7 is a flowchart of a process for formulating a positioning extent of an intersection plaza, according to an embodiment.

FIG. 7 is a flowchart of a process for forming a positioning extent for an intersection plaza, according to one embodiment. In one embodiment, the positioning extent platform 135 performs the process 700 and is implemented in, for instance, a chip set including a processor and a memory as shown in FIG. 10.

In step 701, intersection leg polygon information is obtained. As used herein, intersection leg refers to thoroughfare segments intersecting one or more other thoroughfare segments. The left and right edges of each of the intersection leg polygons represent the left and right positioning extents (as determined by process 300 or 350) of each of the intersection legs. Thus, in one embodiment, step 701 occurs after process 300 or 350 has determined the intersection nodes and formed thoroughfare polygons for each of the intersection legs.

In step 703, it is determined whether the intersection is well-formed. As used herein, a well-formed intersection refers to an intersection which has intersection legs that are evenly spaced around the intersection. If the intersection legs are not evenly spaced, a gap may be said to exist between adjacent intersection legs. As used herein, adjacent intersection legs refer to two successive intersection legs if the intersection legs are traversed clockwise (or anti-clockwise). For example, gaps are frequently found at intersections formed at 3-way T-shaped intersections. In one embodiment, step 703 determines that an intersection is not well-formed if the angle between any two adjacent intersection legs exceeds 170 degrees. If the intersection is determined to not be well-formed, process 700 continues to step 705. Otherwise, process 700 continues to step 707.

In step 705, a dummy intersection leg is created. As used herein, a dummy intersection leg refers to an artificial (e.g., not physically present) intersection leg generated to create a well-formed intersection. In one embodiment, step 705 involves creating an artificial centerline from the intersection node with a heading that lies halfway between the two adjacent intersection legs. In one embodiment, the dummy leg is given a default width. However, it is contemplated that its width may be derived from the dimensions of another intersection leg or from a combination of intersection legs. They dummy intersection leg may be discarded after process 700 ends.

In step 707, the left and right edges of each intersection leg polygon are extended into the intersection. As used herein, the left and right edges of an intersection leg polygon represent the left and right positioning extents of each intersection leg (when oriented in the direction of the intersection). In one embodiment, step 707 involves projecting a line along the left and right edges of each intersection leg polygon (including any dummy intersection leg polygons) into the intersection until the lines from adjacent intersection leg polygons intersect. Specifically, the left edge of each intersection leg polygon may be projected to intersect with the right edge of its adjacent intersection leg polygon. In one embodiment, step 707 involves determining the points where the lines projected along the left and right edges of each intersection leg polygon intersect with lines from adjacent intersection leg polygons.

In step 709, an intersection polygon is formed. In one embodiment, step 709 involves connecting the points of intersection determined in step 707 by straight lines. The intersection polygon, like thoroughfare polygons, represents the positioning extent associated with an intersection plaza. Depending on the number of sides of the polygon so formed, there may be three (in the case of a triangle-shaped intersection) or more positioning extents associated with the intersection. The positioning extent for an intersection plaza may be used to match probe data to the intersection plaza if the probe data lies within the boundaries of the positioning extent.

Figure 8:
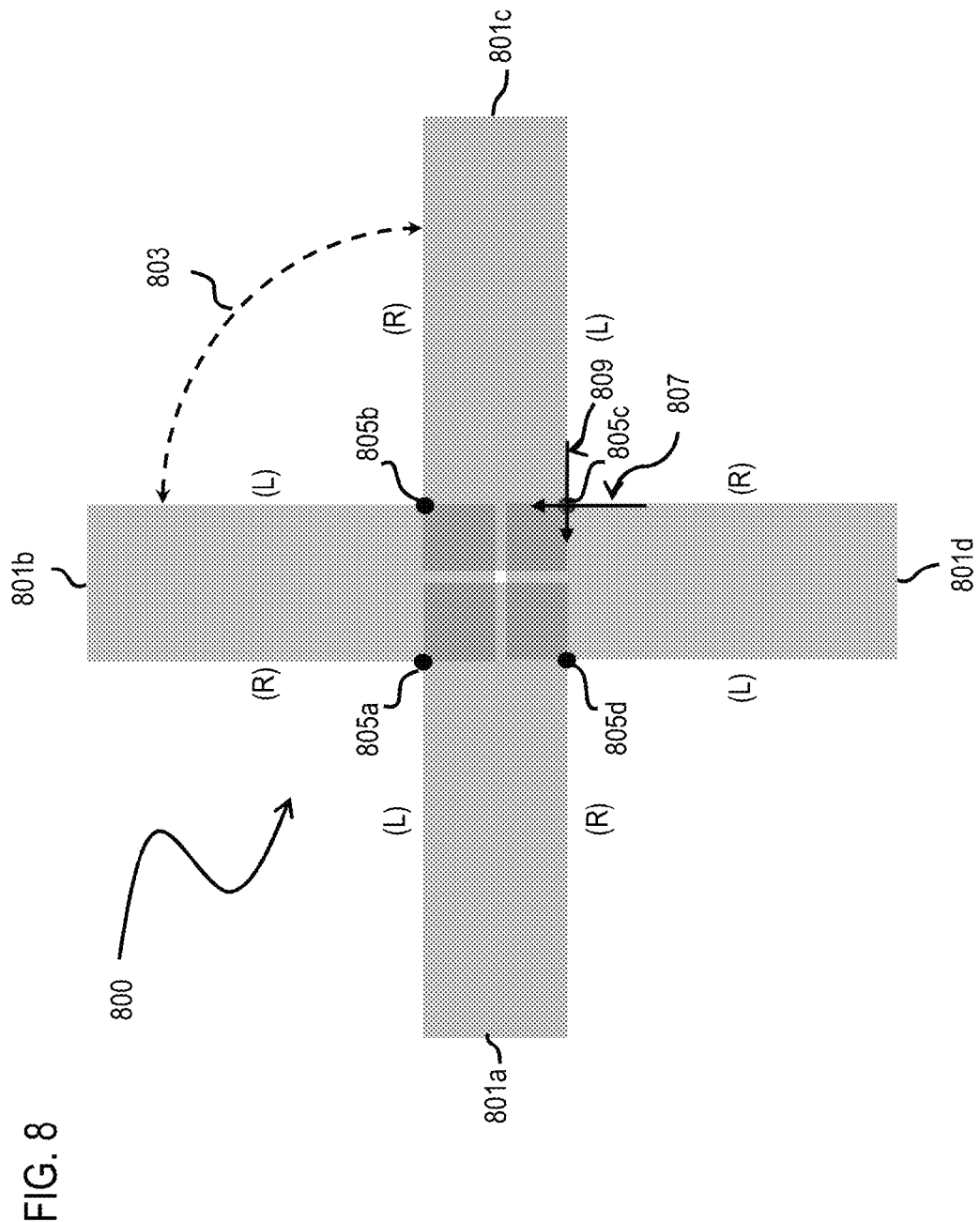
FIG. 8 is a diagram illustrating formulating a positioning extent of an intersection plaza, according to an embodiment.

FIG. 8 diagrammatically illustrates the formation of an intersection polygon, according to an embodiment. As shown, intersection legs 801a-801d create a well-formed intersection 800 because adjacent intersection legs (e.g., 801a and 801b, 801b and 801c, 801c and 801d, and 801d and 801a) are evenly spaced around intersection 800. Intersection 800 may also be determined to be well-formed because the angle between any two adjacent intersection legs 801 (e.g., angle 803) is less than 170 degrees. The points of intersection 805a-805d of adjacent intersection legs are determined as the points where the right (R) edge of one intersection leg (e.g., R-edge 807) intersects with the left (L) edge of its adjacent intersection leg (e.g., L-edge 809). As mentioned, one intersection leg 801 (e.g., intersection leg 801d) may be a dummy intersection leg if, for example, intersection 800 is not well-formed (e.g., because it is a T-shaped junction).

The processes described herein for formulating a positioning extent may be advantageously implemented via software, hardware, firmware or a combination of software and/or firmware and/or hardware. For example, the processes described herein, may be advantageously implemented via processor(s), Digital Signal Processing (DSP)

chip, an Application Specific Integrated Circuit (ASIC), Field Programmable Gate Arrays (FPGAs), etc. Such exemplary hardware for performing the described functions is detailed below.

Figure 9:
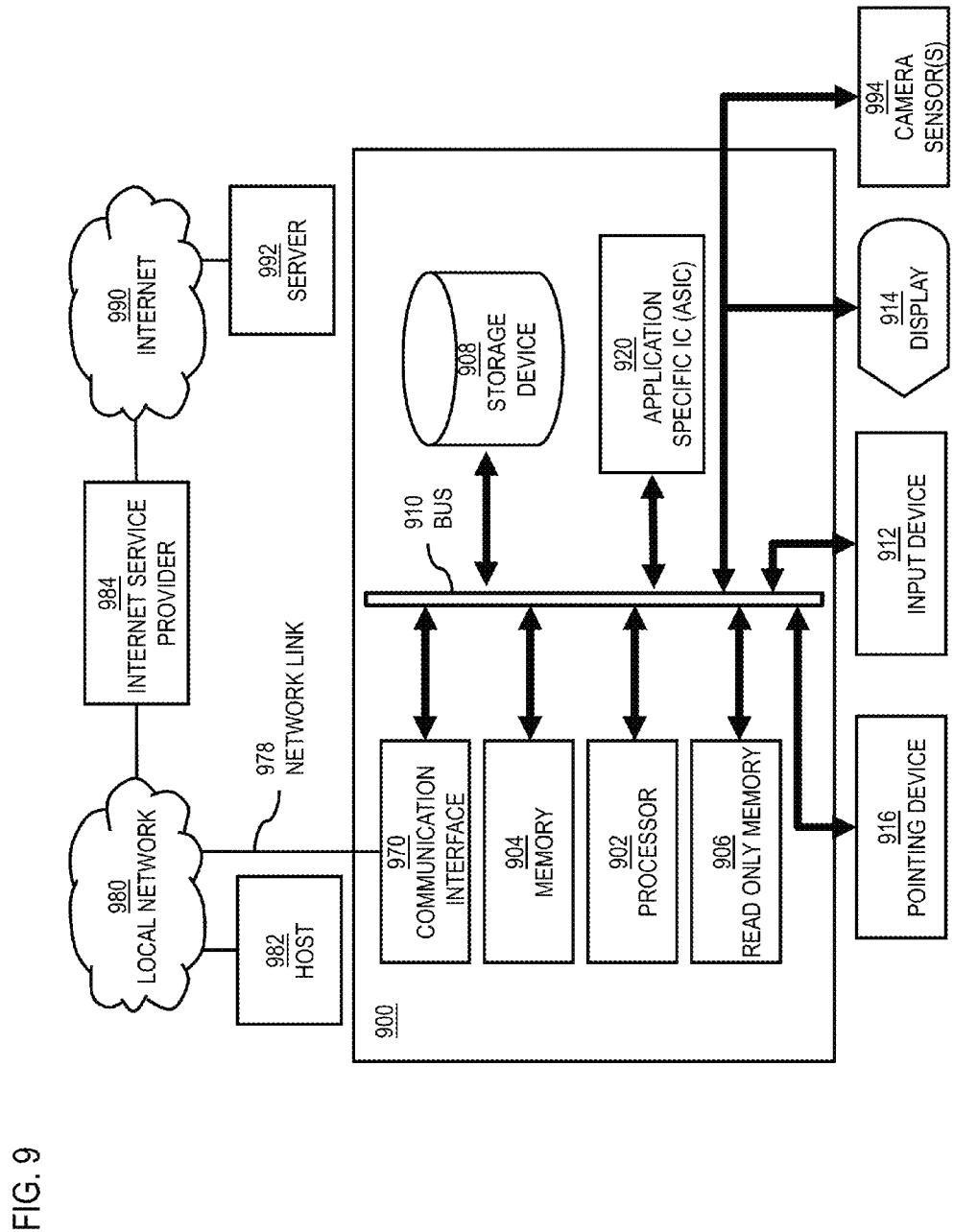
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to formulate a positioning extent as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of formulating a positioning extent.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to formulating a positioning extent. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for formulating a positioning extent. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for formulating a positioning extent, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for formulating a positioning extent to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to formulate a positioning extent as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of formulating a positioning extent.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to formulating a positioning extent. The memory 1005 also stores the data associated with or generated by the execution of the inventive steps.

Figure 11:
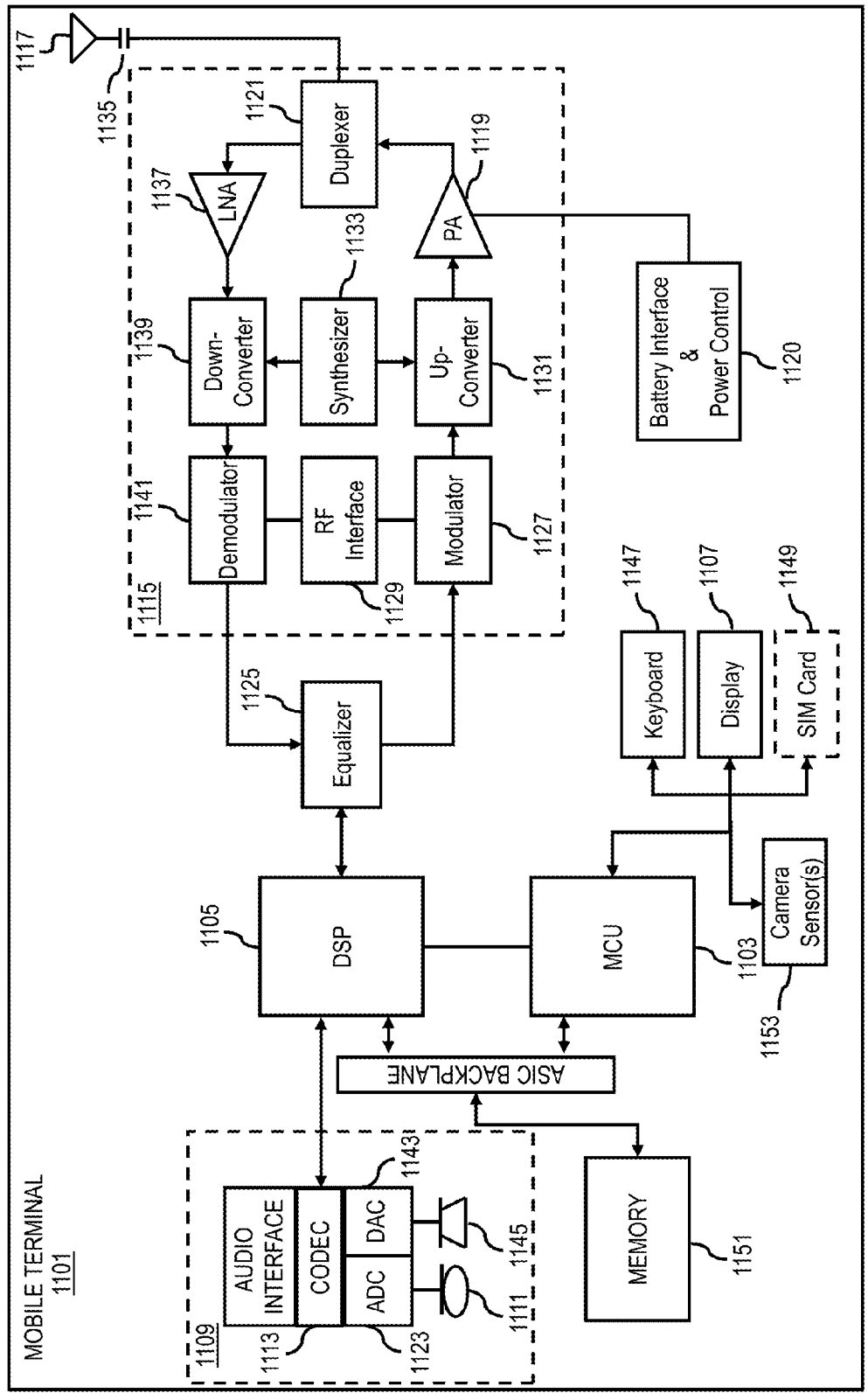
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of formulating a positioning extent. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of formulating a positioning extent. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to formulate a positioning extent. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
processing a plurality of position data points acquired by at least one positioning system to determine one or more variations in the plurality of position data points with respect to one or more established thoroughfare segments;
determining one or more positioning extents associated with the one or more established thoroughfare segments for the at least one positioning system based, at least in part, on the one or more variations, wherein each of the one or more positioning extents comprises a vertical positioning extent above the one or more established thoroughfare segments;
determining at least one centerline for respective segments of the one or more established thoroughfare segments; and
adjusting a width of the thoroughfare segment based upon a posted speed limit for the thoroughfare segment.

2. The method of claim 1, further comprising:
processing the plurality of position data points to determine one or more threshold distances with respect to the centerline,
wherein the one or more variations are based, at least in part, on one or more position data points within the at least one threshold.

3. The method of claim 2, further comprising determining any parallel offset to at least one of the at least one centerline for respective segments, wherein the one or more threshold distances comprise a left and a right positioning extent with respect to the centerline.

4. The method of claim 2, wherein the one or more threshold distances are determined with respect to a statistical average of positions of the plurality of position data points.

5. The method of claim 1, further comprising:
processing the plurality of position data points to determine one or more positioning errors for respective segments of the one or more established thoroughfare segments; and
repositioning a probe data point that is proximate to an established thoroughfare segment based, at least in part, on the positioning error for the established thoroughfare segment,
wherein the one or more variations are based, at least in part, on one or more position data points associated with each respective segment.

6. The method of claim 1, further comprising:
correlating respective positioning extents with the one or more established thoroughfare segments based on a size of one or more physical structures proximate to the one or more established thoroughfare segments.

7. The method of claim 6, wherein a positioning extent for an established thoroughfare segment for which the number of position data points is less than a threshold value is based, at least in part, on the correlation.

8. The method of claim 1, further comprising:
determining an intersection extent associated with an intersection of two or more established thoroughfare segments based, at least in part, on an intersection of two or more positioning extents of the two or more intersecting established thoroughfare segments.

9. The method of claim 1, further comprising:
matching a probe data point to at least one established thoroughfare segment based, at least in part, on whether the probe data point is within a respective positioning extent of the at least one established thoroughfare segment.

10. An apparatus comprising:
at least one processor; and
at least one memory including computer program code for one or more programs,
the at least one memory and the computer program code configured to, with the at least one processor, cause the apparatus to perform at least the following,
process and/or facilitate a processing of a plurality of position data points acquired by at least one positioning system to determine one or more variations in the plurality of position data points with respect to one or more established thoroughfare segments;
determine one or more positioning extents associated with the one or more established thoroughfare segments for the at least one positioning system based, at least in part, on the one or more variations, wherein each of the one or more positioning extents comprises a vertical positioning extent above the one or more established thoroughfare segments;
determine at least one centerline for respective segments of the one or more established thoroughfare segments; and
adjust a width of the thoroughfare segment based upon a posted speed limit for the thoroughfare segment.

11. The apparatus of claim 10, wherein the apparatus is further caused to:
process and/or facilitate a processing of the plurality of position data points to determine one or more threshold distances with respect to the centerline,
wherein the one or more variations are based, at least in part, on one or more position data points within the at least one threshold.

12. The apparatus of claim 11, wherein the one or more threshold distances comprise a left and a right positioning extent with respect to the centerline further comprising determine any parallel offset to at least one of the at least one centerline for respective segments.

13. The apparatus of claim 11, wherein the one or more threshold distances are determined with respect to a statistical average of positions of the plurality of position data points.

14. The apparatus of claim 10, wherein the apparatus is further caused to:
process and/or facilitate a processing of the plurality of position data points to determine one or more positioning errors for respective segments of the one or more established thoroughfare segments; and
cause, at least in part, a repositioning of a probe data point that is proximate to an established thoroughfare segment based, at least in part, on the positioning error for the established thoroughfare segment,
wherein the one or more variations are based, at least in part, on one or more position data points associated with each respective segment.

15. The apparatus of claim 10, wherein the apparatus is further caused to:
determine a correlation of respective positioning extents with the one or more established thoroughfare segments based on a size of one or more physical structures proximate to the one or more established thoroughfare segments.

16. The apparatus of claim 15, wherein a positioning extent for an established thoroughfare segment for which the number of position data points is less than a threshold value is based, at least in part, on the correlation.

17. The apparatus of claim 10, wherein the apparatus is further caused to:
determine an intersection extent associated with an intersection of two or more established thoroughfare segments based, at least in part, on an intersection of two or more positioning extents of the two or more intersecting established thoroughfare segments.

18. The apparatus of claim 10, wherein the apparatus is further caused to:
cause, at least in part, a matching of a probe data point to at least one established thoroughfare segment based, at least in part, on whether the probe data point is within a respective positioning extent of the at least one established thoroughfare segment.

* * * * *